United States Patent
Kim

(10) Patent No.: US 9,131,173 B2
(45) Date of Patent: Sep. 8, 2015

(54) DIGITAL IMAGE PHOTOGRAPHING APPARATUS FOR SKIP MODE READING AND METHOD OF CONTROLLING THE SAME

(75) Inventor: Dong-min Kim, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 535 days.

(21) Appl. No.: 13/304,915

(22) Filed: Nov. 28, 2011

(65) Prior Publication Data

US 2012/0257091 A1    Oct. 11, 2012

(30) Foreign Application Priority Data

Apr. 11, 2011    (KR) .................. 10-2011-0033375

(51) Int. Cl.
*H04N 5/345*    (2011.01)
*H04N 5/235*    (2006.01)
*G03B 7/16*    (2014.01)

(52) U.S. Cl.
CPC .......... *H04N 5/3456* (2013.01); *H04N 5/2354* (2013.01); *G03B 7/16* (2013.01)

(58) Field of Classification Search
CPC ... H04N 5/2354; H04N 5/235; H04N 5/2254; H04N 5/232; H04N 5/772; H04N 5/335; H04N 5/2256; H04N 5/2353; H04N 5/2351; H04N 5/3456

USPC ................. 348/224.1, 222.1, 370, 371, 230.1
See application file for complete search history.

(56) References Cited

U.S. PATENT DOCUMENTS

| | | | |
|---|---|---|---|
| 7,423,674 B2* | 9/2008 | Takeshita | 348/223.1 |
| 7,675,569 B2* | 3/2010 | Maeda | 348/371 |
| 7,728,900 B2* | 6/2010 | Fukushima et al. | 348/311 |
| 7,834,931 B2* | 11/2010 | Tanaka et al. | 348/371 |
| 2003/0030737 A1* | 2/2003 | Yanai | 348/296 |
| 2005/0264688 A1* | 12/2005 | Ouchi | 348/371 |
| 2007/0181687 A1* | 8/2007 | Fukushima et al. | 235/454 |
| 2008/0024655 A1* | 1/2008 | Maeda | 348/371 |
| 2008/0055424 A1 | 3/2008 | Jerdev | |
| 2009/0213247 A1* | 8/2009 | Tanaka et al. | 348/240.99 |
| 2010/0128162 A1* | 5/2010 | Tanaka | 348/345 |

* cited by examiner

*Primary Examiner* — Nicholas Giles
(74) *Attorney, Agent, or Firm* — Drinker Biddle & Reath LLP

(57) ABSTRACT

A digital image photographing apparatus and a method of controlling the digital image photographing apparatus, the method involving dividing an imaging surface of an imaging device into a plurality of areas, and applying a first skip mode to an area that is expected to include a target object and applying a different second skip mode to an area that is not expected to include the target object, so that images having different resolutions may be obtained from the plurality of areas.

24 Claims, 7 Drawing Sheets

IMAGE FOR PHOTOGRAPHING

PRELIMINARY FLASHING IMAGE

DIGITAL IMAGE PHOTOGRAPHING APPARATUS FOR SKIP MODE READING AND METHOD OF CONTROLLING THE SAME

CROSS-REFERENCE TO RELATED PATENT APPLICATION

This application claims the priority benefit of Korean Patent Application No. 10-2011-0033375, filed on Apr. 11, 2011, in the Korean Intellectual Property Office, the entirety of which is incorporated herein by reference.

BACKGROUND

1. Field of the Invention

The invention relates to a digital image photographing apparatus and a method of controlling the same to select flash intensity.

2. Description of the Related Art

A digital camera may determine a main flashing time by performing preliminary flashing and by measuring and calculating reflected light intensity during the preliminary flashing. By doing so, the digital camera may obtain a desired image that is captured at an appropriate exposure. In a complementary metal-oxide-semiconductor (CMOS) image sensor that is operated using a rolling shutter and reads data from an imaging device in line units, the CMOS image sensor determines flashing intensity in main flashing according to a frame rate, and thus read data may not be exposed correctly.

SUMMARY

The invention provides a digital image photographing apparatus and a method of controlling the digital image photographing apparatus to select flash intensity, in which an area of one frame is divided and different skip modes are applied to the divided areas, respectively.

The invention also provides a digital image photographing apparatus and a method of controlling the digital image photographing apparatus, in which flashing intensity in main flashing is correctly calculated to obtain an image that is captured at an appropriate exposure.

According to an aspect of the invention, there is provided a method of controlling a digital image photographing apparatus, the method including the operations of dividing a data read area of an imaging surface of an imaging device into a plurality of data read areas; setting a plurality of skip modes for respective ones of the plurality of data read areas, wherein at least a first of the skip modes differs from a second of the skip modes; and reading image data of an input image from each of the plurality of data read areas.

The skip modes may indicate a process in which a frame of the input image is divided into line units or pixel units, and a data read skips one or more of the lines or one or more of the pixel units for each line unit or pixel unit read.

The method may further include the operations of performing preliminary flashing of a flash; generating a preliminary flashing image by reading the image data of the input image during the preliminary flashing; deriving emission intensity from the preliminary flashing image; performing main flashing of the flash in correspondence to the emission intensity; and exposing the imaging surface of the imaging device by opening a shutter in synchronization with the preliminary flashing and the main flashing.

The operation of generating the preliminary flashing image may include the operation of generating the preliminary flashing image by reading the image data from each of the plurality of data read areas of the imaging surface according to the respective skip modes.

The operation of generating the preliminary flashing image may include the operation of generating the preliminary flashing image by reading the image data at smaller line intervals in a first area from among the plurality of data read areas of the imaging surface, compared to a second area different from the first area.

The operation of generating the preliminary flashing image may include the operation of generating the preliminary flashing image by reading the image data at smaller line intervals in a center area from among the plurality of data read areas of the imaging surface compared to a side area The operation of generating the preliminary flashing image may include the operation of generating the preliminary flashing image by horizontally dividing the image surface into the plurality of areas and then by reading the image data at smaller line intervals in an intermediate area from among the plurality of areas compared to at least one of an upper area or a lower area.

The operation of generating the preliminary flashing image may include the operation of generating the preliminary flashing image by reading the image data at smaller pixel intervals in a first area from among the plurality of data read areas of the imaging surface compared to a second area different from the first area.

The operation of generating the preliminary flashing image may include the operation of generating the preliminary flashing image by dividing the image surface of the imaging unit into the plurality of areas based on a Bayer pattern, and independently reading the image data from each of the plurality of areas.

The method may further include the operation of setting a target object area, the operation of generating the preliminary flashing image may include the operation of generating the preliminary flashing image by reading the image data at smaller intervals in a first area that includes a part of the target object area and that is from among the plurality of data read areas of the imaging surface compared to a second area different from the first area.

The method may further include the operation of recognizing a target object, the operation of setting the target object area may include the operation of setting the target object area to include at least a part of the target object.

The method may further include the operation of deriving a face area of the target object using a face recognition algorithm, the operation of setting the target object area may include the operation of setting the target object area to include at least a part of the face area.

The imaging device may be a CMOS image sensor.

The imaging device may be exposed by a rolling shutter.

According to another aspect of the invention, there is provided a digital image photographing apparatus including an area dividing unit for dividing a data read area of an imaging surface of an imaging device into a plurality of data read areas; a skip mode setting unit for setting skip modes for the plurality of data read areas, wherein at least a first skip mode of a first data read area differs from a second skip mode of a second data read area; and an imaging control unit for controlling the imaging device to read image data of an input image from each of the plurality of data read areas, according to the skip modes.

According to another aspect of the invention, there is provided a digital image photographing apparatus including a flash; a flash driving unit for performing preliminary flashing and main flashing of the flash; a preliminary flashing image generating unit for generating a preliminary flashing image that is obtained during the preliminary flashing and that is generated by independently reading image data from each of a plurality of areas obtained by dividing an imaging surface of an imaging unit, wherein a first rate of reading data from a first of the areas differs from a second rate of reading data from a second of the areas; and an emission intensity deriving unit for deriving flashing intensity in the main flashing from the preliminary flashing image.

The preliminary flashing image generating unit may generate the preliminary flashing image by reading the image data at smaller line intervals in the first of the areas compared to the second of the areas.

The preliminary flashing image generating unit may generate the preliminary flashing image by reading the image data at smaller line intervals in a center area from among the plurality of data read areas of the imaging surface compared to a side area The preliminary flashing image generating unit may generate the preliminary flashing image by horizontally dividing the image surface into the plurality of areas and then by reading the image data at smaller line intervals in an intermediate area from among the plurality of areas compared to at least one of an upper area or a lower area.

The preliminary flashing image generating unit may generate the preliminary flashing image by reading the image data at smaller pixel intervals in the first of the areas compared to the second of the areas.

The preliminary flashing image generating unit may generate the preliminary flashing image by dividing the image surface of the imaging unit into the plurality of areas based on a Bayer pattern, and independently reading the image data from each of the plurality of areas.

The digital image photographing apparatus may further include a target object area setting unit that sets a target object area, and the preliminary flashing image generating unit may generate the preliminary flashing image by reading the image data at smaller intervals in the first of the areas that includes a part of the target object area compared to the second of the areas.

The digital image photographing apparatus may further include a target object recognizing unit that recognizes a target object, and the target object area setting unit may set the target object area to include at least a part of an image of the target object.

The digital image photographing apparatus may further include a face recognizing unit that derives a face area of the target object using a face recognition algorithm, the target object area setting unit may set the target object area to include at least a part of the face area.

The digital image photographing apparatus may further include an imaging device; a shutter; and a shutter driving unit that opens the shutter in synchronization with the preliminary flashing and the main flashing to expose the imaging surface of the imaging device.

The imaging device may be a CMOS image sensor.

The shutter may include a rolling shutter.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, a digital image photographing apparatus according to one or more embodiments of the invention will be described in detail by explaining exemplary embodiments of the invention with reference to the attached drawings.

As used herein, the term "and/or" includes any and all combinations of one or more of the associated listed items.

In the embodiments, a digital camera is described as an example of the digital image photographing apparatus. However, the one or more embodiments are not limited thereto, and thus may be applied to digital devices including a digital camcorder, a personal digital assistant (PDA), a smart phone, or the like.

Figure 1:
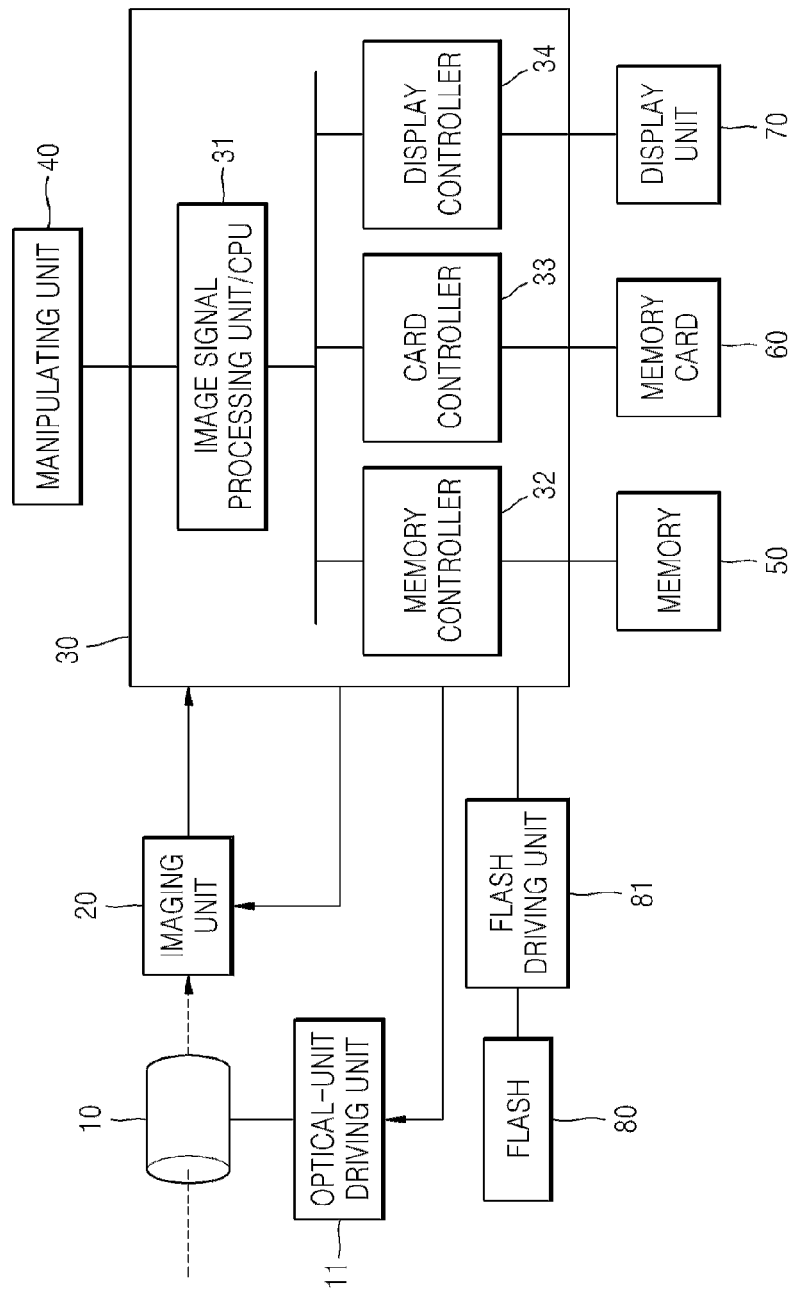
FIG. 1 is a block diagram of a digital camera shown as an example of a digital image photographing apparatus, according to an embodiment of the invention.

FIG. 1 is a block diagram of a digital camera shown as an example of a digital image photographing apparatus, according to an embodiment of the invention.

Referring to FIG. 1, the digital camera includes an optical unit 10, an optical-unit driving unit 11 for driving the optical unit 10, an imaging unit 20, a camera control unit 30, a manipulating unit 40, a memory 50, a memory card 60, and a display unit 70.

The optical unit 10 includes an image forming lens system for collecting an optical signal from a target object, a shutter, and an aperture. The image forming lens system may include a focus lens for adjusting a focus, and a zoom lens for adjusting a focal length. In the present embodiment, the shutter includes a rolling shutter. Here, the rolling shutter is an electronic shutter used in a CMOS image sensor. Since the CMOS image sensor is non-linearly scanned, an exposure, image scanning, and a process of combining scanned images are asynchronous.

The optical-unit driving unit 11 may include a focus lens driving unit for adjusting a position of the focus lens, an aperture driving unit for adjusting a level of opening and closing of the aperture, and a shutter driving unit for adjusting opening and closing of the shutter.

The imaging unit 20 includes an imaging device that generates an image signal from imaging image light passing through the image forming lens system, which may be an interchangeable lens system. The imaging device may include a plurality of photoelectric conversion devices arrayed in a matrix, and a vertical and/or horizontal transmission path for deriving the image signal by moving charges from the photoelectric conversion devices, in synchronization with a timing signal. The imaging device may be a CMOS image sensor.

Also, the digital camera includes the camera control unit 30. The camera control unit 30 includes an image signal processing unit/CPU 31.

The image signal processing unit/CPU 31 may calculate an Auto White Balance (AWB) evaluation value for adjusting a white balance with respect to the image signal obtained from the imaging unit 20, an Auto Exposure (AE) evaluation value for adjusting an exposure, and an Auto Focusing (AF) evaluation value for adjusting a focus, and may control the appropriate white balance, the exposure, and the adjusting of the exposure according to the calculated evaluation values. Also, the image signal processing unit/CPU 31 may perform various application operations including object recognition such as face recognition, scene recognition, and the like. Also, the image signal processing unit/CPU 31 may perform image processing for record preservation, and image processing for a display. An example of the image processing may include gamma correction, color filter array interpolation, a color matrix, color correction, color enhancement, or the like. For the record preservation, the image signal processing unit/CPU 31 may perform compression processing such as Joint Photographic Experts Group (JPEG) compression, JPEG 2000 compression, Lempel-Ziv-Welch (LZW) compression, or the like.

Also, the camera control unit 30 may include a memory controller 32, a card controller 33, and a display controller 34.

The memory controller 32 may temporarily store a captured image, various types of information, or the like in the memory 50, or may obtain a captured image, various types of information, or the like from the memory 50. Also, the memory controller 32 may read program information stored in the memory 50. The memory 50 may include a buffer memory that temporarily stores a captured image, various types of information, or the like, and may include dynamic random access memory (DRAM), synchronous dynamic random access memory (SDRAM), or the like. Also, the memory 50 may include flash memory, read-only memory (ROM), or the like, as a storage device for storing a program.

The card controller 33 may store and read an image file in the memory card 60. The card controller 33 may control not only reading and storing of the image file but also control storing of various types of information to be preserved and reading thereof. The memory card 60 may include a secure digital (SD) card or the like. In the present embodiment, the memory card 60 is used as a storage medium. However, the storage medium is not limited thereto, and thus may store the image file and the various types of information using a recording medium including an optical disc (e.g., a compact disc (CD), a digital versatile disc (DVD), a Blu-ray disc, or the like), a magneto-optical disc, a magnetic disc, or the like. In a case where the storage medium uses a recording medium including an optical disc (the CD, the DVD, the Blu-ray disc, or the like), a magneto-optical disc, a magnetic disc, or the like, the storage medium may further include a reading device capable of reading the recording medium.

The display controller 34 may control an image display on the display unit 70. The display unit 70 may use a liquid crystal display (LCD), an organic light-emitting diode (OLED), or the like.

Also, the digital camera includes the manipulating unit 40 for inputting a manipulation signal provided by a user. The manipulating unit 40 may include members for performing various settings when the user manipulates the digital camera or performs photographing. For example, the manipulating unit 40 may be formed as one or more buttons, one or more keys, a touch panel, a touch screen, a dial, or the like. User manipulation signals including power on/off, photographing start/stop, reproduction start/stop/search, driving of an optical system, mode conversion (e.g., execution of a moving picture photographing mode, or the like), menu manipulation, selection manipulation, or the like may be input via the manipulating unit 40. For example, a shutter button may be half-pressed, completely-pressed, and released by the user. When the shutter button is half-pressed (S1 manipulation), a manipulation signal for starting a focus control is output, and when the half-press is released, the focus control is ended. When the shutter button is completely-pressed (S2 manipulation), a manipulation signal for starting photographing may be output. The manipulation signals may be transmitted to the image signal processing unit/CPU 31, and thus may drive a corresponding configuration element.

The digital camera further includes a flash 80 and a flash driving unit 81. The flash 80 functions to illuminate a target object when photographing is performed in low light such as at night outside or in a dim place. When photographing is performed using the flash 80, a flashing command from the image signal processing unit/CPU 31 is delivered to the flash driving unit 81, and in response to the flashing command, the flash driving unit 81 drives flashing of the flash 80 (i.e., emission of light by the flash 80). In the present embodiment, the flash 80 performs preliminary flashing or weak flashing for measuring intensity of light reflected by the target object to calculate emission intensity during main flashing or a main flashing time according to the flashing command from the image signal processing unit/CPU 31. Here, the flash 80 is formed of a Xenon flash, which has a shorter flashing time but greater emission intensity compared to an LED and thus is commonly used in a digital camera, or the like. The flash 80 performs the preliminary flashing and the flash driving unit 81 or the image signal processing unit/CPU 31 determines the main flashing time according to an image signal obtained during the preliminary flashing. This will be particularly described at a later time with reference to drawings.

Figure 2A:
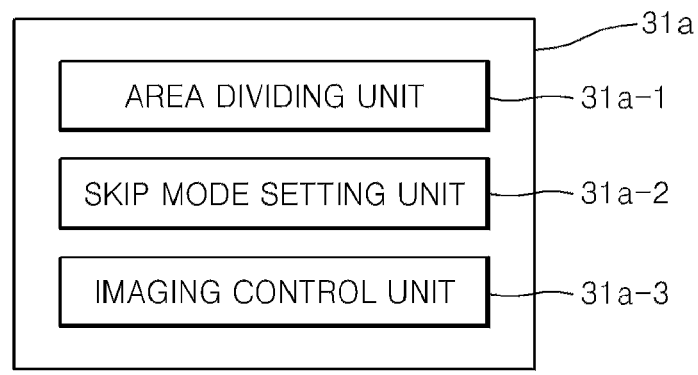
FIG. 2A is a block diagram describing an example of an image signal processing unit/central processing unit (CPU) of FIG. 1, according to an embodiment of the invention.
Figure 2B:
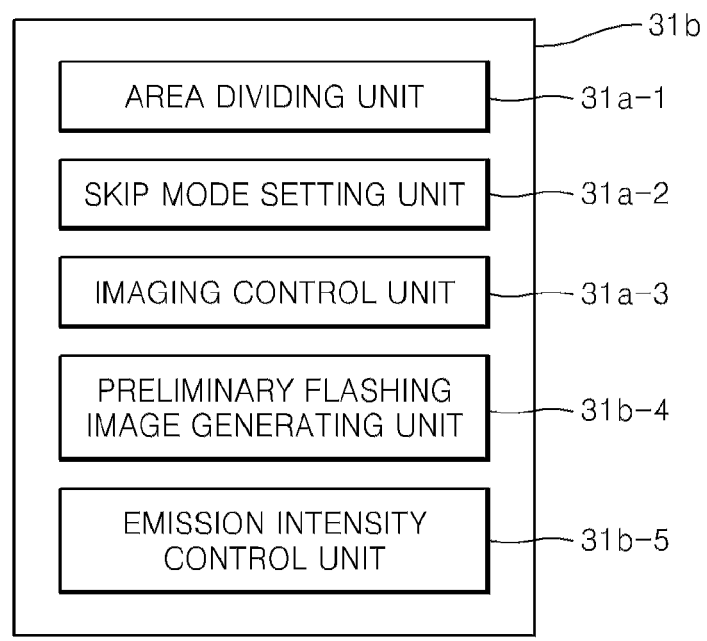
FIG. 2B is a block diagram describing another example of the image signal processing unit/CPU of FIG. 1, according to another embodiment of the invention.
Figure 2C:
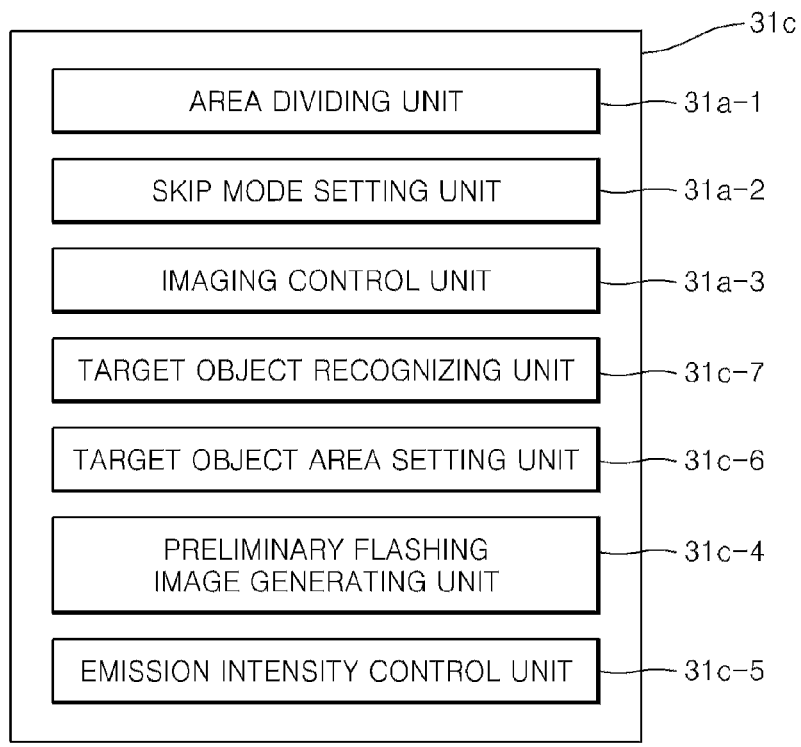
FIG. 2C is a block diagram describing another example of the image signal processing unit/CPU of FIG. 1, according to another embodiment of the invention.

FIGS. 2A through 2C are block diagrams for describing examples of the image signal processing unit/CPU 31 of FIG. 1. That is, any of the examples of FIGS. 2A through 2C may be used to implement the image signal processing unit/CPU 31 of FIG. 1.

Referring to FIG. 2A, an image signal processing unit/CPU 31a includes an area dividing unit 31a-1, a skip mode setting unit 31a-2, and an imaging control unit 31a-3.

Figure 6:
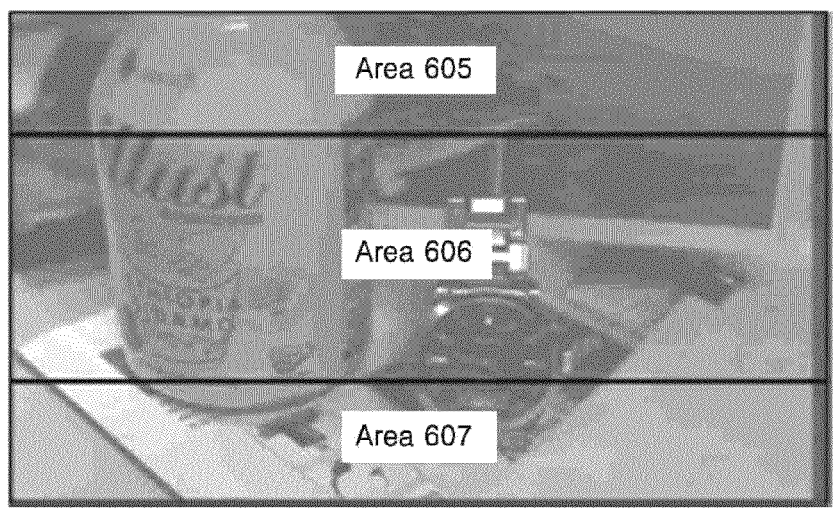

The area dividing unit 31a-1 divides a data read area of an imaging surface of the imaging device (included in the imaging unit 20 of FIG. 1). Here, the data read area may be divided into two or more data read areas. For example, an area with respect to one frame image of an input image may be trisected into data read areas 605 through 607 as shown in FIG. 6.

Figure 7:
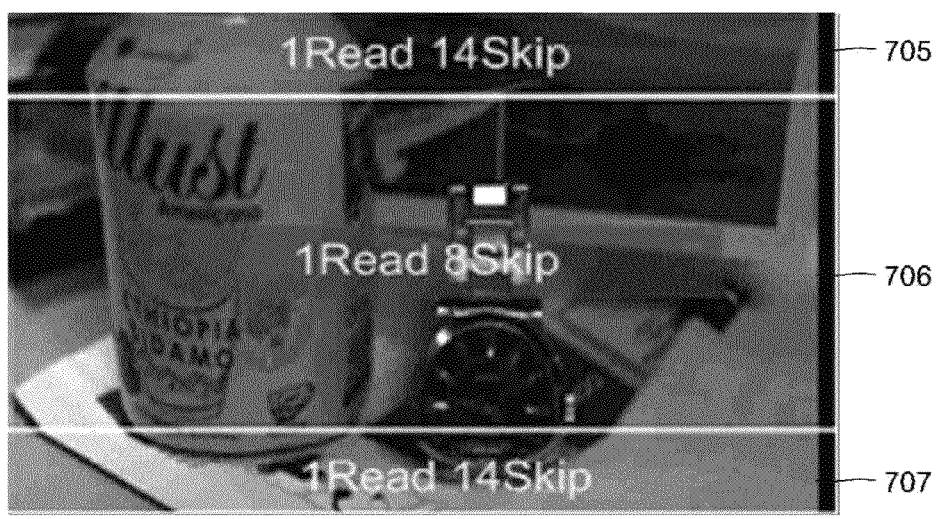

The skip mode setting unit 31a-2 sets a different skip mode to each of the divided data read areas 605 through 607, respectively. Here, the skip mode indicates a process in which a frame of an input image is divided into line units or pixel units, and a data read skips one or more of the line units or one or more of the pixel units. For example, as illustrated in FIG. 7, for every horizontal line that is read 14 lines are skipped in an uppermost area 705, for every horizontal line that is read 8 lines are skipped in an intermediate area 706, and for every horizontal line that is read 14 lines are skipped in a lowermost area 707. In FIG. 7, the skip mode is performed with respect to the line units, but the skip mode may be performed with respect to a number of pixels. Also, in an image sensor having color pixels, the skip mode may be performed in consideration of a Bayer pattern. Via the skip mode, the data read is performed while the number of skipped lines is increased with respect to an area in which it is not necessary that accuracy of obtained data be high, an area in which a main target object does not exist, or an area that does not require a high resolution, so that a data read speed may be increased. On the other hand, with respect to an area in which it is necessary that accuracy of obtained data be high, an area in which a main target object exists, or an area that requires a high resolution, the data read is performed while the number of skipped lines is decreased, so that it is possible to obtain more exact or accurate image data.

The imaging control unit 31a-3 controls the imaging device (included in the imaging unit 20 of FIG. 1) to read image data of an input image from each of the data read areas according to its skip mode set by the skip mode setting unit 31a-2.

In the present embodiment, the number of divided data read areas, and an area division direction, e.g., a horizontal direction or a vertical direction, may be changed by a user selection, and setting of the skip mode, e.g., the number of skipped lines or the number of skipped pixels, may be changed by a user selection.

Referring to FIG. 2B, an image signal processing unit/CPU 31b includes the area setting unit 31a-1, the skip mode setting unit 31a-2, the imaging control unit 31a-3, a preliminary flashing image generating unit 31b-4, and an emission intensity control unit 31b-5. Here, descriptions regarding the same configuring elements as those of FIG. 2A are not repeated, and added configuration elements will now be described.

The preliminary flashing image generating unit 31b-4 generates a preliminary flashing image that is obtained during preliminary flashing by the flash 80 (refer to FIG. 1), and that is generated by independently reading image data from each of a plurality of areas obtained by dividing the imaging surface of the imaging unit 20.

The preliminary flashing image generating unit 31b-4 may generate the preliminary flashing image by reading the image data from each of the plurality of areas of the imaging surface at different line intervals. For example, the imaging surface of the imaging unit 20 may be divided into the plurality of areas (e.g., the areas 605 through 607 of FIG. 6 or the areas 705-707 of FIG. 7), a skip mode is independently set for each of the plurality of areas, and then a plurality of pieces of data may be simultaneously read from the imaging unit 20 but may be independently processed. In an embodiment, the preliminary flashing image generating unit 31b-4 may generate the preliminary flashing image by reading image data at smaller line intervals in a first area (e.g., the area 706) from among the plurality of areas of the imaging surface as compared to a second area (e.g., the area 705) different from the first area. In another embodiment, the preliminary flashing image generating unit 31b-4 may generate the preliminary flashing image by reading image data at smaller line intervals in a center area from among the plurality of areas of the imaging surface compared to a side area. In another embodiment, the preliminary flashing image generating unit 31b-4 may generate the preliminary flashing image by horizontally dividing the image surface into a plurality of areas and then by reading image data at smaller line intervals in an intermediate area from among the plurality of areas compared to at least one of upper and lower areas. Alternatively, the preliminary flashing image generating unit 31b-4 may generate the preliminary flashing image by reading image data at smaller pixel intervals in a first area from among the plurality of areas of the imaging surface compared to a second area different from the first area. The preliminary flashing image generating unit 31b-4 may alternatively generate the preliminary flashing image by dividing the image surface of the imaging unit 20 into a plurality of areas, in consideration of a Bayer pattern, and then by independently reading image data from each of the plurality of areas.

The emission intensity control unit 31b-5 may calculate flashing intensity during main flashing of the flash 80 by referring to the preliminary flashing image.

FIG. 2C is a block diagram illustrating yet another example of the image signal processing unit/CPU 31 of FIG. 1. In this regard, an image signal processing unit/CPU 31c of FIG. 2C will be described with respect to its difference from the image signal processing unit/CPU 31a and the image signal processing unit/CPU 31b of FIGS. 2A and 2B.

The image signal processing unit/CPU 31c may further include a target object area setting unit 31c-6 that sets a target object area. A preliminary flashing image generating unit 31c-4 may generate a preliminary flashing image by reading image data at smaller line intervals in a first area that includes a part of the target object area and that is from among a plurality of areas of an imaging surface compared to a second area different from the first area, and an emission intensity control unit 31c-5 may determine flashing intensity in main flashing according to the preliminary flashing image. In more detail, the emission intensity control unit 31c-5 may calculate a flashing time of the flash 80 in the main flashing, according to the preliminary flashing image.

Also, the image signal processing unit/CPU 31c may further include a target object recognizing unit 31c-7 that recognizes the target object.

In the present embodiment, the target object recognizing unit 31c-7 may include a face recognizing unit that detects a face area using a face recognition algorithm. Here, the target object area setting unit 31c-6 may set the target object area to include at least a part of the face area.

Figure 3:
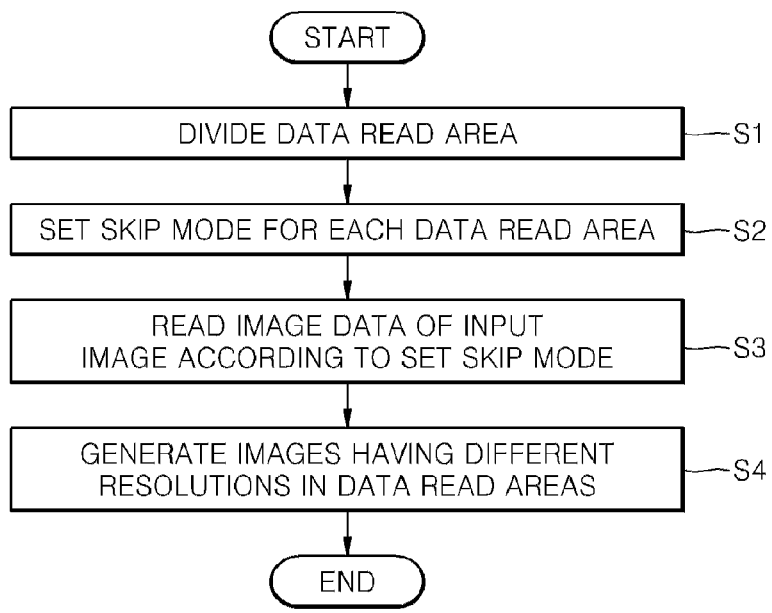
FIG. 3 is a flowchart describing a method of controlling a digital image photographing apparatus, according to an embodiment of the invention.

FIG. 3 is a flowchart describing a method of controlling a digital image photographing apparatus, according to an embodiment of the invention.

Referring to FIG. 3, a data read area is divided (operation S1). Here, the data read area denotes an area of an imaging surface of an imaging device (refer to the imaging unit 20 of FIG. 1) on which light passing through the optical unit 10 of FIG. 1 is incident. The data read area may be divided into two or more data read areas.

A skip mode is set for each of the divided data read areas (operation S2). The skip mode denotes a process in which not all image signals formed on the imaging surface but only those corresponding to predetermined lines are read while other lines are skipped according to a determined number of skipped lines or a determined number of skipped pixels.

According to the set skip mode, image data of an input image is read (operation S3). Thus, image data is not read from the entire area on which the light is incident but is differently read from each of the divided data read areas according to the set skip mode. For example, as illustrated in FIG. 7, for each horizontal line read 14 lines may be skipped in an uppermost area 705, for each horizontal line read 8 lines may be skipped in an intermediate area 706, and for each horizontal line read 14 lines may be skipped in a lowermost area 707.

Images having different resolutions are generated in the divided data read areas (operation S4). For example, referring to the example of FIG. 7, among the divided data read areas 705 through 707, a resolution of the image obtained from the intermediate area 706 in which the smallest number of lines is skipped is highest, and a resolution of the images obtained from the uppermost and lowermost areas 705 and 707 in which the highest number of lines is skipped is lowest.

Thus, according to the present embodiment, the imaging surface of the imaging device is divided into a plurality of areas, and a skip mode is applied to an area that is expected to include a target object and a different skip mode is applied to an area that is not expected to include a target object, so that images having different resolutions may be obtained from the plurality of areas, respectively.

Figure 4:
FIG. 4 shows an original image for comparison.
Figure 5:
FIGS. 5 through 7 show preliminary flashing images, according to an embodiment of the invention.

FIG. 4 shows an original image for comparison. FIG. 5 shows a preliminary flashing image according to a comparative example in which a single skip mode is applied without dividing an imaging surface. In order to minimize deformation of an image due to a rolling shutter, the preliminary flashing image increases a frame rate. For example, in order to increase the frame rate, a skip mode is performed to read image data from an imaging device at predetermined intervals, but this may deteriorate accuracy of data when emission intensity is determined. The preliminary flashing image of FIG. 5 shows this problem. In FIG. 5, a watch is an important target object that determines flashing intensity in main flashing. If the flashing intensity is not sufficient, light is saturated in a metal portion of the watch, and thus an image may not be appropriately captured.

FIG. 6 illustrates an imaging surface that is divided to derive a preliminary flashing image, according to an embodiment of the invention. In the present embodiment, the preliminary flashing image is generated by horizontally trisecting the imaging surface, by independently applying skip modes to areas 605 through 607, respectively, and then by reading data from them. The generated preliminary flashing image is shown in FIG. 7. Referring to FIGS. 6 and 7, in general, the preliminary flashing image may be generated by reading data from the area 606, that is, an intermediate area including a target object, while skipping 2 line intervals, and by reading data from the upper and lower areas 605 and 607 while skipping lines 10 line intervals.

The division of the imaging surface, and a number of lines or a number of pixels to be skipped in the skip mode may vary by a user or a manufacturer.

In the present embodiment, the skip mode involves skipping horizontal lines but is not limited thereto, and thus may perform a skipping operation in pixel units.

Figure 8:
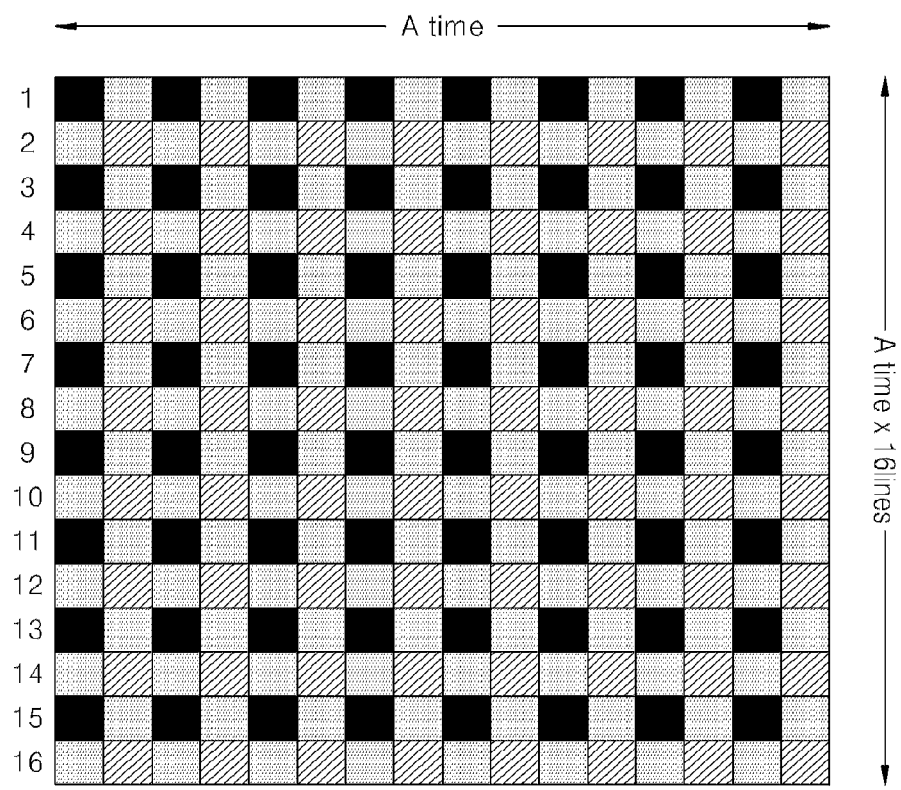
FIG. 8 illustrates generation of a preliminary flashing image in consideration of a Bayer pattern, according to an embodiment of the invention.

Also, as illustrated in FIG. 8, a skip mode may be performed in consideration of a Bayer pattern. For example, according to the Bayer pattern of FIG. 8, odd lines or odd pixels indicate the same color information, and thus, a preliminary flashing image may be generated by performing a skip mode in which even lines or even pixels are skipped. By doing so, the preliminary flashing image generated may be used to exactly calculate flashing intensity during main flashing.

Figure 9:
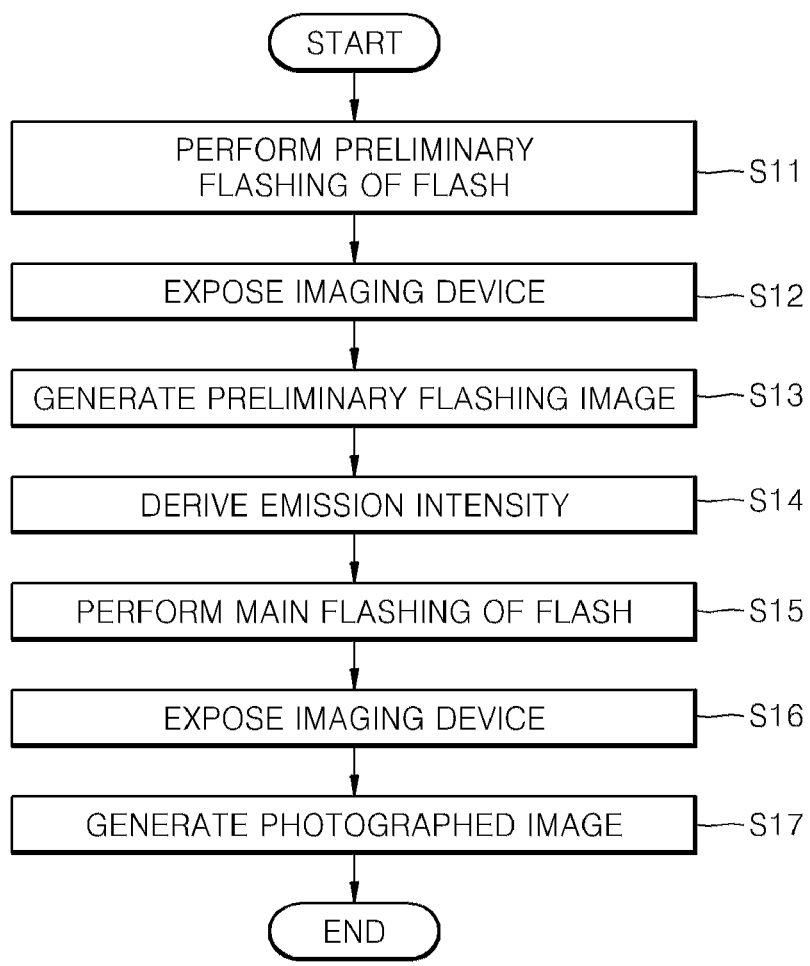
FIG. 9 is a flowchart describing a method of controlling a digital image photographing apparatus, according to another embodiment of the invention.

FIG. 9 is a flowchart describing a method of controlling a digital image photographing apparatus, according to another embodiment of the invention. Although not illustrated in FIG. 9, operations of FIG. 9 may be performed in combination with the method of controlling a digital image photographing apparatus of FIG. 3.

Referring to FIG. 9, first, a flash performs preliminary flashing (operation S11).

An imaging device is exposed during the preliminary flashing of the flash (operation S12), and a preliminary flashing image that is obtained during the preliminary flashing is generated by independently reading image data from each of a plurality of areas obtained by dividing an imaging surface of the imaging device (operation S13). As described in the previous embodiments, the imaging surface may be divided into a plurality of areas, and for example, different skip modes may be independently applied to the plurality of areas, respectively. Although not illustrated in FIG. 9, the method may further include an operation of setting a target object area, and thus the preliminary flashing image may be generated by reading the image data at smaller line intervals in a first area that includes a part of the target object area and that is from among the plurality of areas of the imaging surface compared to a second area different from the first area. Also, the method may further include an operation of recognizing a target object, and thus the target object area may be set to include at least a part of the recognized target object. The operation of setting the target object may further include an operation of deriving a face area of the target object using a face recognition algorithm, and thus the target object area may be set to include at least a part of the face area.

Afterward, emission intensity is derived from the preliminary flashing image (operation S14).

In correspondence to the emission intensity, the flash is lighted or operated (operation S15).

By opening a shutter in synchronization with the preliminary flashing and the main flashing, the imaging surface of the imaging device is exposed (operation S16). Afterward, a captured image is generated (operation S17).

Thus, according to the method, the preliminary flashing image is generated by applying the different skip modes to the divided areas, respectively, flashing intensity for the main flashing is determined according to the generated preliminary flashing image, and thus the flashing intensity in the main flashing is more accurately calculated. By doing so, it is possible to obtain a desired image that is captured at an appropriate exposure.

According to the one or more embodiments, an imaging surface of an imaging device is divided into a plurality of areas, and a skip mode is applied to an area that is expected to include a target object and a different skip mode is applied to an area that is not expected to include a target object, so that images having different resolutions may be obtained from the plurality of areas, respectively.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method of controlling a digital image photographing apparatus, the method comprising:
    dividing a data read area of an imaging surface of an imaging device into a plurality of data read areas;
    setting a plurality of skip modes for respective ones of the plurality of data read areas, wherein at least a first skip mode of a first data read area differs from a second skip mode of a second data read area, wherein the plurality of skip modes comprises the first and second skip modes and the plurality of data read areas comprises the first and second data read areas;
    according to the respective skip mode of the plurality of skip modes, reading image data of an input image from each of the plurality of data read areas, the input image comprising the image data read from each of the plurality of data read areas;
    performing preliminary flashing of a flash;
    generating a preliminary flashing image by reading the image data of the input image during the preliminary flashing according to the plurality of skip modes;
    deriving emission intensity from the preliminary flashing image;
    performing main flashing of the flash in correspondence to the emission intensity; and
    exposing the imaging surface of the imaging device by opening a shutter in synchronization with the preliminary flashing and the main flashing;
    wherein the generating of the preliminary flashing image comprises generating the preliminary flashing image by reading the image data at smaller line intervals in a center area from among the plurality of data read areas of the imaging surface compared to a side area.

2. The method of claim 1, wherein the plurality of skip modes indicate a process in which a frame of the input image is divided into line units or pixel units, and a data read skips one or more of the lines or one or more of the pixel units for each line unit or pixel unit read.

3. The method of claim 1, wherein the generating of the preliminary flashing image comprises generating the preliminary flashing image by reading the image data from each of the plurality of data read areas of the imaging surface according to the respective skip mode of the plurality of skip modes.

4. The method of claim 1, wherein the generating of the preliminary flashing image comprises generating the preliminary flashing image by reading the image data at smaller line intervals in a first area from among the plurality of data read areas of the imaging surface compared to a second area different from the first area.

5. A method of controlling a digital image photographing apparatus, the method comprising:
    dividing a data read area of an imaging surface of an imaging device into a plurality of data read areas;
    setting a plurality of skip modes for respective ones of the plurality of data read areas, wherein at least a first skip mode of a first data read area differs from a second skip mode of a second data read area, wherein the plurality of skip modes comprises the first and second skip modes and the plurality of data read areas comprises the first and second data read areas;

according to the respective skip mode of the plurality of skip modes, reading image data of an input image from each of the plurality of data read areas, the input image comprising the image data read from each of the plurality of data read areas;

performing preliminary flashing of a flash;

generating a preliminary flashing image by reading the image data of the input image during the preliminary flashing according to the plurality of skip modes;

deriving emission intensity from the preliminary flashing image;

performing main flashing of the flash in correspondence to the emission intensity; and exposing the imaging surface of the imaging device by opening a shutter in synchronization with the preliminary flashing and the main flashing;

wherein the generating of the preliminary flashing image comprises generating the preliminary flashing image by horizontally dividing the image surface into the plurality of areas and then by reading the image data at smaller line intervals in an intermediate area from among the plurality of areas compared to at least one of an upper area or a lower area.

6. The method of claim 1, wherein the generating of the preliminary flashing image comprises generating the preliminary flashing image by reading the image data at smaller pixel intervals in a first area from among the plurality of data read areas of the imaging surface compared to a second area different from the first area.

7. The method of claim 1, wherein the generating of the preliminary flashing image comprises generating the preliminary flashing image by dividing the image surface of the imaging unit into the plurality of areas based on a Bayer pattern, and independently reading the image data from each of the plurality of areas.

8. A method of controlling a digital image photographing apparatus, the method comprising:

dividing a data read area of an imaging surface of an imaging device into a plurality of data read areas;

setting a plurality of skip modes for respective ones of the plurality of data read areas, wherein at least a first skip mode of a first data read area differs from a second skip mode of a second data read area, wherein the plurality of skip modes comprises the first and second skip modes and the plurality of data read areas comprises the first and second data read areas;

according to the respective skip mode of the plurality of skip modes, reading image data of an input image from each of the plurality of data read areas, the input image comprising the image data read from each of the plurality of data read areas;

performing preliminary flashing of a flash;

generating a preliminary flashing image by reading the image data of the input image during the preliminary flashing according to the plurality of skip modes;

deriving emission intensity from the preliminary flashing image;

performing main flashing of the flash in correspondence to the emission intensity; and exposing the imaging surface of the imaging device by opening a shutter in synchronization with the preliminary flashing and the main flashing;

the method further comprising setting a target object area, wherein the generating of the preliminary flashing image comprises generating the preliminary flashing image by reading the image data at smaller intervals in a first area that comprises a part of the target object area and that is from among the plurality of data read areas of the imaging surface compared to a second area different from the first area.

9. The method of claim 8, further comprising recognizing a target object, wherein the setting of the target object area comprises setting the target object area to include at least a part of the target object.

10. The method of claim 9, further comprising deriving a face area of the target object using a face recognition algorithm, wherein the setting of the target object area comprises setting the target object area to include at least a part of the face area.

11. The method of claim 1, wherein the imaging device comprises a complementary metal-oxide-semiconductor (CMOS) image sensor.

12. The method of claim 1, wherein the imaging device is exposed by a rolling shutter.

13. A digital image photographing apparatus comprising:

an area dividing unit for dividing a data read area of an imaging surface of an imaging device into a plurality of data read areas;

a skip mode setting unit for setting respective skip modes for the plurality of data read areas, wherein at least a first skip mode of a first data read area of the plurality of data read areas differs from a second skip mode of a second data read area of the plurality of data read areas; and an imaging control unit for controlling the imaging device to read image data of an input image from each of the plurality of data read areas according to the skip modes, the input image comprising the image data read from each of the plurality of data read areas;

a flash driving unit for performing preliminary flashing and main flashing of a flash;

a preliminary flashing image generating unit for generating a preliminary flashing image that is obtained during the preliminary flashing according to the respective skip modes for the plurality of data read areas, the preliminary flashing image comprising the image data read from each of the plurality of areas; and an emission intensity control unit for determining flashing intensity in the main flashing from the preliminary flashing image;

wherein the preliminary flashing image generating unit generates the preliminary flashing image by horizontally dividing the image surface into the plurality of areas and then by reading the image data at smaller line intervals in an intermediate area from among the plurality of areas compared to at least one of an upper area or a lower area.

14. A digital image photographing apparatus comprising:

a flash;

a flash driving unit for performing preliminary flashing and main flashing of the flash;

a preliminary flashing image generating unit for generating a preliminary flashing image that is obtained during the preliminary flashing and that is generated by independently reading image data from each of a plurality of areas obtained by dividing an imaging surface of an imaging unit, wherein a first rate of reading data from a first area of the plurality of areas differs from a second rate of reading data from a second area of the plurality of areas, the preliminary flashing image comprising the image data read from each of the plurality of areas; and an emission intensity control unit for determining flashing intensity in the main flashing from the preliminary flashing image;

wherein the preliminary flashing image generating unit generates the preliminary flashing image by horizontally dividing the image surface into the plurality of areas and then by reading the image data at smaller line intervals in an intermediate area from among the plurality of areas compared to at least one of an upper area or a lower area.

15. The digital image photographing apparatus of claim 14, wherein the preliminary flashing image generating unit generates the preliminary flashing image by reading the image data at smaller line intervals in the first area of the plurality of areas compared to the second area of the plurality of areas.

16. The digital image photographing apparatus of claim 14, wherein the preliminary flashing image generating unit generates the preliminary flashing image by reading the image data at smaller line intervals in a center area from among the plurality of data read areas of the imaging surface compared to a side area from among the plurality of data read areas.

17. The digital image photographing apparatus of claim 14, wherein the preliminary flashing image generating unit generates the preliminary flashing image by reading the image data at smaller pixel intervals in the first of the areas compared to the second of the areas.

18. The digital image photographing apparatus of claim 14, wherein the preliminary flashing image generating unit generates the preliminary flashing image by dividing the image surface of the imaging unit into the plurality of areas based on a Bayer pattern, and independently reading the image data from each of the plurality of areas.

19. The digital image photographing apparatus of claim 14, further comprising a target object area setting unit that sets a target object area, wherein the preliminary flashing image generating unit generates the preliminary flashing image by reading the image data at smaller intervals in the first of the areas that comprises a part of the target object area compared to the second of the areas.

20. The digital image photographing apparatus of claim 19, further comprising a target object recognizing unit that recognizes a target object, wherein the target object area setting unit sets the target object area to include at least a part of an image of the target object.

21. The digital image photographing apparatus of claim 19, further comprising a face recognizing unit that derives a face area of the target object using a face recognition algorithm, wherein the target object area setting unit sets the target object area to include at least a part of the face area.

22. The digital image photographing apparatus of claim 14, further comprising:

an imaging device;

a shutter; and a shutter driving unit that opens the shutter in synchronization with the preliminary flashing and the main flashing to expose the imaging surface of the imaging device.

23. The digital image photographing apparatus of claim 22, wherein the imaging device comprises a complementary metal-oxide-semiconductor (CMOS) image sensor.

24. The digital image photographing apparatus of claim 22, wherein the shutter comprises a rolling shutter.

* * * * *